(No Model.)
W. P. ELLIOTT.
DEVICE FOR LOOSENING AND CUTTING SUGAR.
No. 365,247. Patented June 21, 1887.
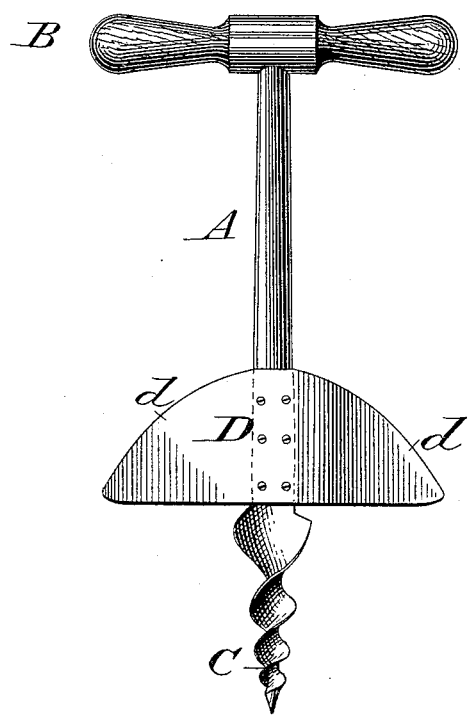
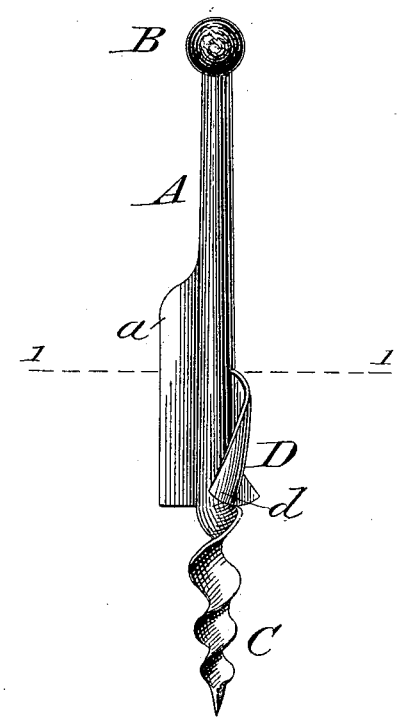
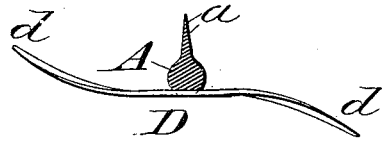
Witnesses
F. H. Schott
Fred E. Tasker.
Inventor
William P. Elliott,
By his Attorney John C. Tasker
N. PETERS, Photo-Lithographer, Washington, D. C.

UNITED STATES PATENT OFFICE.

WILLIAM P. ELLIOTT, OF SHELBYVILLE, INDIANA.

DEVICE FOR LOOSENING AND CUTTING SUGAR.

SPECIFICATION forming part of Letters Patent No. 365,247, dated June 21, 1887.

Application filed September 20, 1886. Serial No. 214,007. (No model.)

*To all whom it may concern:*

Be it known that I, WILLIAM P. ELLIOTT, a citizen of the United States, residing at Shelbyville, in the county of Shelby and State of Indiana, have invented certain new and useful Improvements in Devices for Loosening and Cutting Sugar; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to a tool or device for use in loosening, breaking up, and cutting sugar, dried fruit, or other packed and compressed material; and it consists in the device, and the construction, arrangement, and combination of its parts, substantially as will be hereinafter described.

In the annexed drawings, Figure 1 is a side elevation of my improved device. Fig. 2 is an end elevation of the same, and Fig. 3 is a horizontal sectional plan view on the line 1 1 of Fig. 2.

Like letters refer to like parts in all the figures.

A represents the stem or shank of my improved loosening and breaking tool, having at its upper end a cross-bar or handle, B, and at the lower end of which is formed or attached a screw-point, C, which resembles the point of a carpenter's auger, but is constructed with whatever pitch and depth of thread seems best adapted to serve the purposes of the tool. Adjoining the screw-point, and a slight distance above it, a loosening or crushing blade, D, is secured transversely to the stem A by suitable attaching means. This blade D consists of the radial or diametrical wings *d d*, which are curved in a horizontal plane and likewise in a vertical plane. The blade D may be of any suitable configuration; but the form adopted by preference is that shown in the drawings, where the basal line of the blade is in a horizontal plane, and when viewed from below is seen to be compoundly curved, while the upper outline is approximately a semicircular curve joining the extremities of the base, said curve following the periphery of the convoluted wings. Thus the blade will be pointed at each end and better fitted to finely divide the compressed material.

The stem A is formed with a longitudinal blade or cutter, *a*, extending, preferably, from about midway of the stem to the beginning of the auger-point and sharpened along its edge, as shown in Fig. 3. The purpose of this blade is to dissever the lumps or hard aggregations which the blade D may not have succeeded in disintegrating.

In view of the above description, the operation of the device will be easily understood. It is first inserted into the mass of sugar, dried fruit, or other compressed substance, and rotated, causing the spiral point to bore its way downward, the curved cutter following hard thereupon, and thus loosening or cutting the surrounding material and bringing it to a more or less finely comminuted condition, so that it may be readily scooped up or otherwise removed from the receptacle that contains it. Any lumps or hard pieces that remain uncrushed after the rotative action of the device has been concluded may be easily broken and divided by striking them with the side blade.

Having thus described my invention, what I claim as new, and desire to secure by Letters Patent, is—

1. A device for loosening and cutting sugar and like substances, the loosening-blade D, consisting of horizontally and vertically curved wings that extend in opposite directions, in combination with the shank A, having screw-point C, substantially as and for the purposes specified.

2. The herein-described device for loosening and cutting sugar and like substances, consisting of the shank provided with longitudinal and transverse blades, substantially as described.

3. In a device for loosening and cutting sugar and like substances, the combination, with the shank A, having longitudinal blade *a*, and screw-point C, of the transverse blade D, secured to the shank, and consisting of the horizontally and vertically curved wings *d d*, substantially as described.

In testimony whereof I affix my signature in presence of two witnesses.

WILLIAM P. ELLIOTT.

Witnesses:
CHARLES A. ROSS,
JOHN W. ELLIOTT.